(No Model.)  6 Sheets—Sheet 1

A. W. BROWNE.
SURGICAL ENGINE.

No. 562,800.  Patented June 30, 1896.

FIG. 1.

WITNESSES:  INVENTOR:

(No Model.)  6 Sheets—Sheet 2.

A. W. BROWNE.
SURGICAL ENGINE.

No. 562,800.  Patented June 30, 1896.

WITNESSES:  INVENTOR:

(No Model.) 6 Sheets—Sheet 4.
A. W. BROWNE.
SURGICAL ENGINE.

No. 562,800. Patented June 30, 1896.

WITNESSES: INVENTOR:

(No Model.) 6 Sheets—Sheet 6.

A. W. BROWNE.
SURGICAL ENGINE.

No. 562,800. Patented June 30, 1896.

WITNESSES:
Roth E. Gordon
Edw. F. Simpson, Jr.

INVENTOR:
A. W. Browne
By Atty
J. C. Peyton

UNITED STATES PATENT OFFICE.

ARTHUR W. BROWNE, OF PRINCE'S BAY, NEW YORK, ASSIGNOR TO THE S. S. WHITE DENTAL MANUFACTURING COMPANY, OF PHILADELPHIA, PENNSYLVANIA.

SURGICAL ENGINE.

SPECIFICATION forming part of Letters Patent No. 562,800, dated June 30, 1896.

Application filed November 14, 1895. Serial No. 568,966. (No model.)

*To all whom it may concern:*

Be it known that I, ARTHUR W. BROWNE, a citizen of the United States, residing at Prince's Bay, in the county of Richmond and State of New York, have invented certain new and useful Improvements in Surgical Engines; and I do hereby declare the following to be a full, clear, and exact description of the invention, such as will enable others skilled in the art to which it appertains to make and use the same.

My invention relates to certain improvements, as hereinafter claimed, mainly applicable to engines especially adapted for use in surgical operations of various kinds requiring the cutting or severing of bone, but some of which improvements are also applicable to engines for use by dentists.

In the accompanying drawings.

Figure 1:
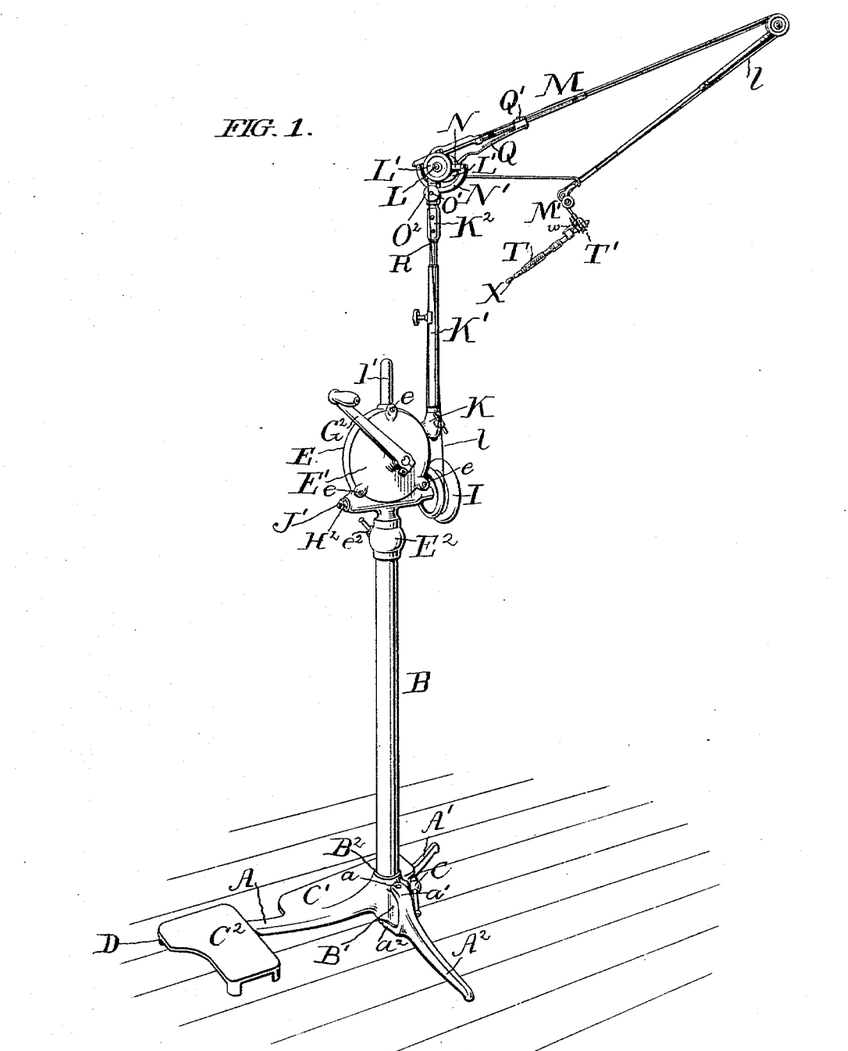
Figure 1 is a view in perspective, on a smaller scale than the other views, of the improved engine.
Figures 2, 3, 4, 5:
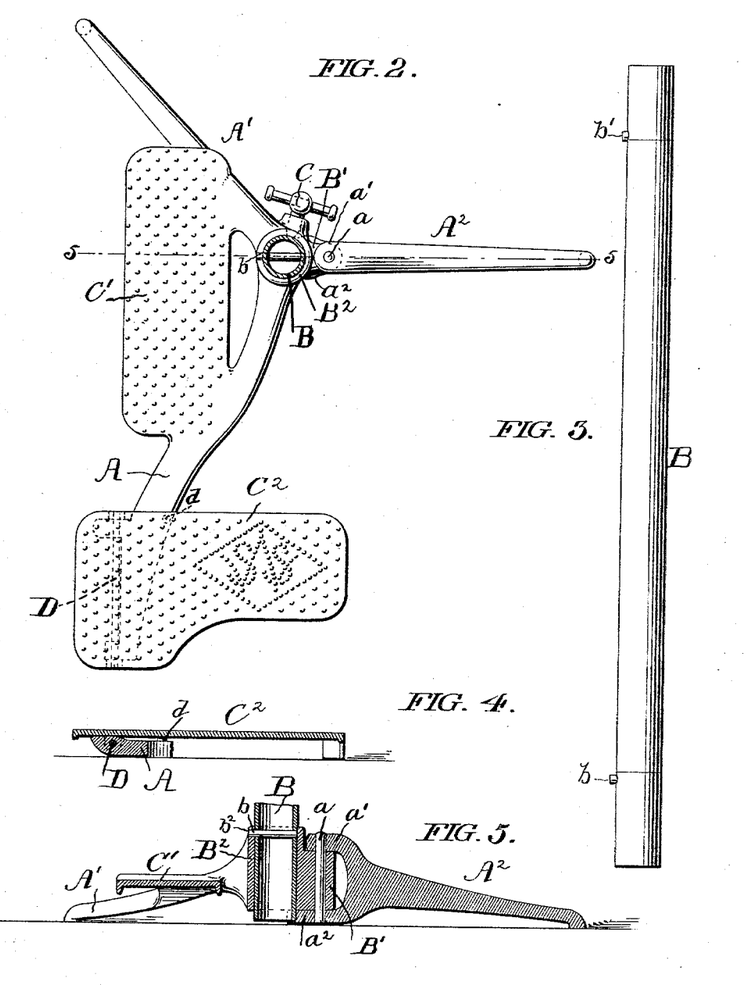
Fig. 2 is a view showing the base portion of the supporting-frame in plan and the standard or upright portion thereof in section.
Fig. 3, a view in elevation of the upright portion of the frame.
Fig. 4 shows a section through the frame-base and the foot-rest pivoted thereto.
Fig. 5 is a view in section on the line 5 of Fig. 2.

The engine-frame is composed of a base-section having legs A A' A$^2$, and an upright section or standard B, detachably connected with the base. The base-leg A$^2$ has jointed connection with the other legs A A' by means of a pivot $a$, passing through forks $a'$ $a^2$ of the leg A$^2$ and through a lug B', made rigid with the legs A A' by being cast integral with them. The frame-base is formed with a socket B$^2$ at the junction of the legs, into which fits the frame-upright B, which is made tubular for lightness and strength and is provided with two side projections $b$ $b'$, shown as formed by fixed pins. The projection $b$ engages a seat $b^2$, formed by a notch in the frame-base, to prevent the turning of the frame-upright in the base, and a set-screw C serves to lock the upright against accidental withdrawal from the base. The upright projects through and slightly beneath the base-socket, and the bottom fork $a^2$ of the pivoted leg is of concave form at its extremity, so as to abut against and partially embrace and snugly engage the projecting lower end of the frame-upright. The jointed leg is thus locked against turning about its pivot when the frame-sections are properly connected, and the frame is firmly supported upon its three legs.

It will be seen that the frame-sections may readily be put together to constitute a rigid frame and the parts be quickly disconnected, leaving the jointed leg free to be folded against one of the rigid legs. The parts may thus be compactly packed for transportation.

Two of the base-legs A A' have rigidly connected with them a foot-rest C, (shown as cast with the legs,) upon which is to be placed one foot of the person who imparts motion to the engine, and to one of these legs, A, is secured another foot-rest C² for the other foot of this person. A pivot D, passing through lugs on the leg and on the under side of the heel end of the foot-rest, (see Fig. 4 and dotted lines, Fig. 2,) serves to joint the foot-rest C² in place. This pivoted foot-rest projects in the same or approximately the same direction as the leg A² of the base, and the downward movement of its outer or toe end is limited by contact of the foot-rest with the leg A by way of a stop $d$ in advance of the pivotal connection of the rest with this leg and much nearer the pivot than the toe of the rest. The stop $d$, which may be either on the foot-rest or on the frame-leg, serves to arrest downward movement of the foot-rest, so as to prevent contact of its toe with the floor upon which the engine-frame may be supported. In this way it will be seen that the weight of the person who works the engine, as further on to be explained fully, is utilized to steady it; that pressure of the foot upon the pivoted foot-rest at or near its toe or in advance of its pivot transfers part of the weight of the person working the engine to the leg A², thus insuring a steady support of the engine, and that as the pivoted foot-rest cannot come in contact with the floor upon which the frame-base rests it does not interfere with the support by the frame-legs of the entire weight of the engine and the person working it.

Figure 6:
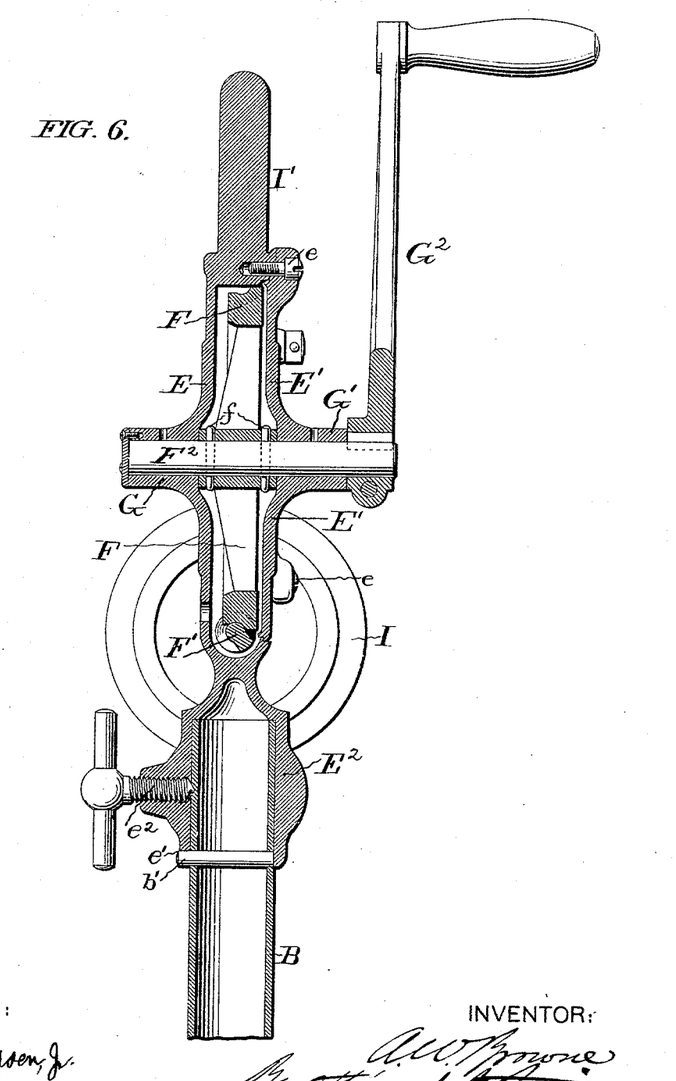
Fig. 6 is a view, partly in elevation and partly in vertical central section, showing the upper end of the supporting-frame and the driving-gearing and manner of mounting it.
Figures 7, 8:
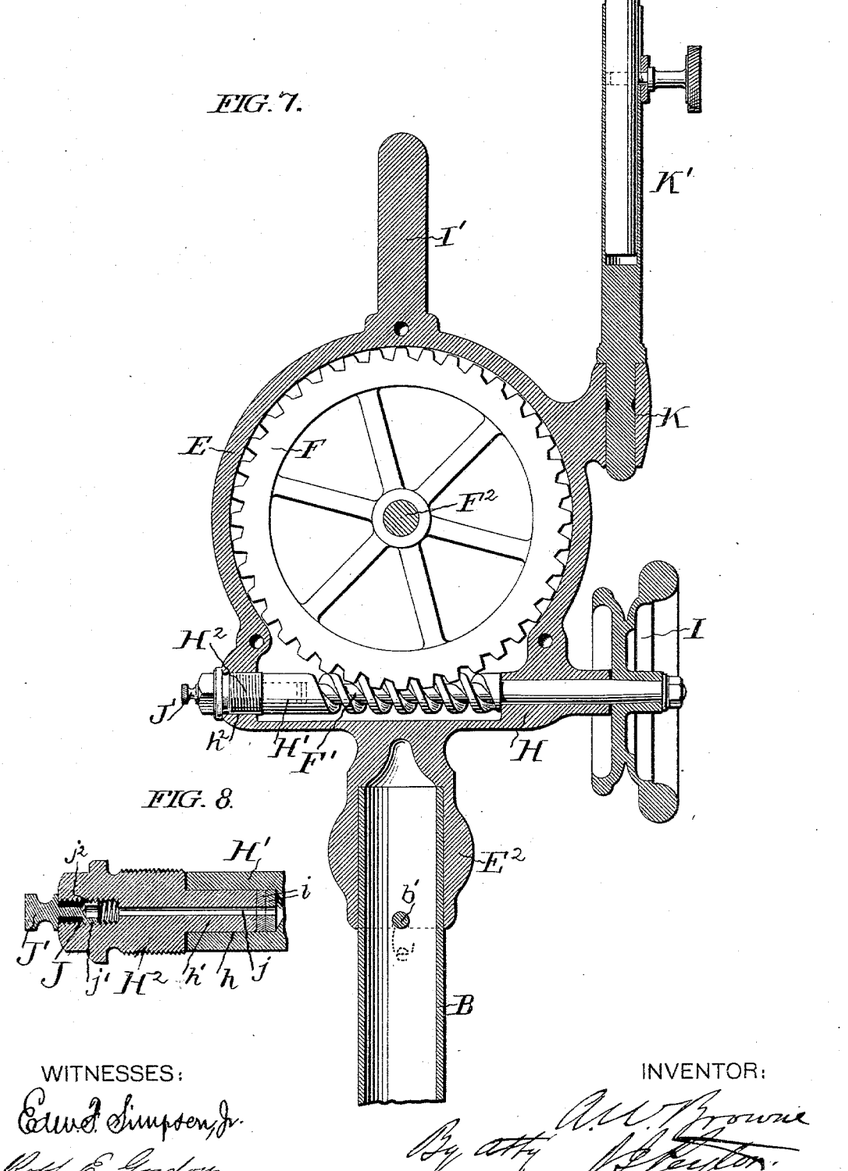
Fig. 7 is a view, partly in elevation and partly in central vertical section, at a right angle with Fig. 6.
Fig. 8 is a sectional view showing details of the manner of supporting one end of the worm-shaft of the driving-gearing.

The driving mechanism of the engine is supported at the top of the upright portion of the engine-frame in the following way: A sectional frame for the driving-gearing employed is shown as composed of two parts E E', detachably connected by screws $e$ and constituting a casing in which the gearing is inclosed. The main section E of the gearing frame and housing is provided with an attaching sleeve or socket E² to fit upon the upper end of the tubular upright of the engine-frame, and this attaching-sleeve is notched at $e'$ to constitute a seat engaged by the pin end or projection $b'$ near the top of the frame-upright. A set-screw $e^2$ is also provided as an additional securing device, thus insuring a firm but readily-detachable connection between the parts, which may quickly be separated for packing and transportation.

The gearing shown consists of a worm-gear F and a worm F', actuated thereby. This worm-gearing is mounted in its frame in the following way: The driving-shaft F², to which the main gear F is fastened by pins $f f$, is mounted in bearings G G', provided by the two sections of the gearing-frame, and a crank-handle G² is secured to the driving-shaft so as to be readily detachable therefrom. At one end the shaft of the worm F' is mounted in a bearing H, provided by the main section of the gearing-frame, and the shaft projects from this bearing and has a grooved pulley I detachably fastened to it. The other and larger end H' of the worm-shaft is bored out to constitute a bearing $h$, supported upon the journal $h'$ of a journal-piece detachably secured in the main section of the gearing-frame by screw-threaded connection between the enlarged portion H² of the journal-piece and an opening $h^2$ in said frame-section. The journal-piece has a squared head to be engaged by a wrench, and has a hole $j$ extending longitudinally of it from its inner end toward its outer end and terminating in a larger screw-threaded hole J, extending to the outer end of the journal-piece. A screw-plug has a part $j'$ threaded to engage the hole J, and a head J' by which to grasp it and screw it in or out. The threaded portion of this plug is grooved or cut away at one side, as at $j^2$, so as to admit of the passage of oil by way of the opening $j$ to the bearing $h$ and journal $h'$.

It will be seen that the screw-plug may be screwed outward far enough to admit oil to the threaded opening J without entirely detaching the plug, and that the oil is allowed to pass to the bearing and journal by way of the groove in the threaded portion of the plug and the hole $j$.

Washers $i$ in suitable number are placed in the bearing $h$ at the end of the journal $h'$, and this journal may be adjusted as required by screwing the journal-piece in or out in its threaded opening in the gearing-frame.

It will be seen that a person standing on the foot-rests, grasping the hand-support I' at the top of the gearing-frame with one hand to steady and brace himself, and turning the crank-handle with the other hand, is enabled to impart rapid motion by the gearing to the pulley I on the worm-shaft.

Figures 9, 10, 11, 12, 13:
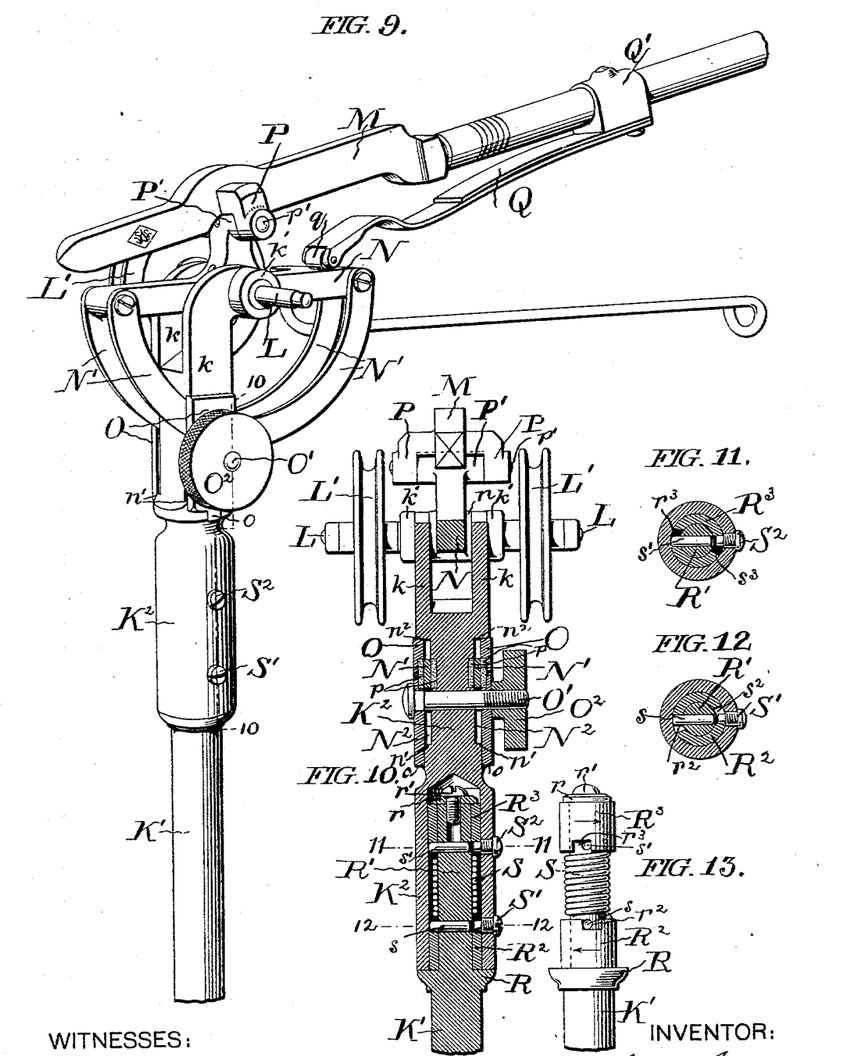
Fig. 9 is a view in perspective showing the upper portion of the extensible engine-standard, the rocking pulley-head, and a portion of the jointed engine-arm, one of the pulleys of the pulley-head being omitted.
Fig. 10 is a view, partly in elevation and partly in section, on the line 10 of Fig. 9.
Fig. 11 is a section on the line 11 of Fig. 10.
Fig. 12 is a section on the line 12 of Fig. 10.
Fig. 13 is a view in elevation showing a portion of the engine-standard with the pulley-head detached therefrom.

The gearing-frame is provided with a socket K for a sectional extensible standard K' of the engine, this engine-standard being fitted at the lower end of its main section in the socket and detachably secured by a set-screw, so as to permit of ready separation of the parts for packing. The upper or pulley-head section K² of the extensible engine-standard terminates at top in curved forks $k k$, having bearings $k' k'$ for the shaft L of the guide-pulleys L' L', about which passes the driving-cord $l$, to which motion is imparted by the pulley I.

An engine-arm M, composed of jointed sections in well-known way, has adjustable rocking connection with the pulley-head section K² of the engine-standard in the following way: A carrier for the engine-arm comprises a cross-head or arm N, adapted to rock on the pulley-head section of the engine-standard by being secured by its hub $n$ between the forks $k k$ of said section to the rocking shaft L. Two thin plates N' N', constituting a segment of a circle, are secured at their opposite ends by screws to opposite sides of the two extremities of the carrier cross-head. These segmental plates are of springy metal, so as to yield to lateral pressure, and as shown are semicircular, but they may constitute more or less than half-circles according to the extent of rocking movement which it may be desired to impart to the engine-arm in manner as in turn to be explained. Side recesses N² N² are provided in the pulley-head standard-section between shoulders n' n' and n² n², and clamp-plates O O are provided for acting on the rocking carrier N' N'. Each clamp-plate abuts at its upper end against one of the shoulders n² and is provided at its lower end with a lug o to enter its appropriate notch in one of the lower shoulders n', both of which are similarly notched, as will be understood by reference to Figs. 9 and 10. A headed screw O', passing through the pulley-head standard-section and through the clamp-plates, and a set-nut O² serve, as will readily be understood, to cause the clamp-plates to yieldingly clamp the rocking carrier so as to afford more or less resistance to its rocking movement. Washer-like pieces $p$ of leather, or other suitable material, are secured in sockets in the clamp-plates and in the recessed portions of the pulley-head standard-section at opposite sides of the segmental plates of the engine-arm carrier, and serve to protect the parts against wear as well as increase frictional resistance to the movement of the rocking carrier. The pieces $p$ may readily be replaced by others as they wear.

From the above description it will be seen that by suitably connecting the engine-arm with its carrier it may be allowed a vertical rocking movement within certain limits, and that the resistance to this rocking movement may be nicely regulated.

In order that the weight of the engine-arm and parts carried thereby may be counterbalanced, or nearly so, and thus relieve operators of unnecessary labor and fatigue, the engine-arm is pivotally connected with its carrier and acted upon by a spring in the following way: Near its inner end the engine-arm is provided with lugs P P, through which passes a pivot $p'$, which also passes through a lug P', projecting upwardly from the carrier cross-head midway the length thereof. A spring Q, shown as formed of two plates or leaves, is detachably and adjustably connected at one end with the engine-arm and beneath it by way of a screw-attached clip Q', and at its opposite or free end the spring is adapted to slide upon the engine-arm carrier, being provided with a roller $q$, bearing on the top or cross-head portion of the carrier. The tendency of the spring is to lift the engine-arm by rocking it upward about its pivotal connection with its carrier. Upward rocking movement of the engine-arm independently of its carrier is arrested by contact of the heel or inner end of the arm with the carrier cross-head, while downward movement is arrested by contact of the arm in advance of its pivot with the roller end of the upholding-spring, as will be obvious. When at either of these extremes of its movement permitted independently of its carrier the arm becomes as though rigid with the carrier as to movement in one direction and may be rocked therewith upward or downward, according to the position of the arm and the movement which it may be desired to impart to it.

To permit of desired horizontal swing of the engine-arm in either direction from its normal position independently of the movement allowed by the turning of the engine-standard K' in its support K, the pulley-head section of the standard is mounted as follows: This standard-section is tubular at its lower portion and rests at its lower end upon an annular shoulder R of the second or endwise-adjustable section of the extensible standard K', which above this shoulder is reduced in diameter and constitutes a post R', which is surrounded by the tubular portion of the pulley-head section of the standard. Between this tubular portion and the post R' are two collars or short sleeves R² R³, loose or adapted to turn on the post. The lower collar R² rests on the shoulder R, and the upper collar R³ is prevented from moving upward by a washer $r$, secured to the top of the standard-post by a screw $r'$. A coiled spring S, encircling the standard-post, is secured at its opposite ends to the collars and acts with a tendency to turn them in opposite directions about the standard-post. A slot $r^2$ is made in the upper edge of the lower collar, and a like slot $r^3$ is made in the lower edge of the upper collar. Pins $s\,s'$ are secured to the standard-post, and one of them projects into the slot $r^2$ and the other into the slot $r^3$. It will be seen that the collars can be turned in opposition to the force exerted by their spring, the one to the left and the other to the right, as indicated by the arrows in Fig. 13. Movement allowed the collars in opposite directions against the stress of their spring is limited by contact of the stop-pins with the shoulders at the ends of the respective slots, while the shoulders at the opposite ends of these slots bear against the stop-pins to limit movement which may be imparted to the collars by the action of their spring. The tubular portion of the pulley-head standard-section is provided with two screws S' S², the inner ends of which constitute pins engaging, respectively, with an edge slot $s^2$ in the lower collar R² and an edge slot $s^3$ in the upper collar R³ opposite the slots respectively engaged by the pins $s\,s'$. When the one screw-pin is engaged with the shoulder at one end—say the left—of the collar-slot entered by it, the other screw-pin is engaged with the shoulder at the opposite or right extremity of the other collar-slot. The parts are shown in the drawings (see Figs. 10 to 13, inclusive) as in their normal positions. It is obvious that by slight strain exerted on the engine-arm it may be swung to the right or to the left to a slight extent by the yield of the spring S, and that upon relieving the engine-arm of such strain it will be automatically returned to its normal position.

The driving-cord $l$ passes about suitable pulleys on the jointed engine-arm, as common in dental engines, such, for instance, as shown in United States Letters Patent No. 503,740, dated August 22, 1893, and also about a pulley having connection with the rotary spindle of the handpiece carrying the instrument to be operated.

Figures 14, 15, 19, 20, 21:
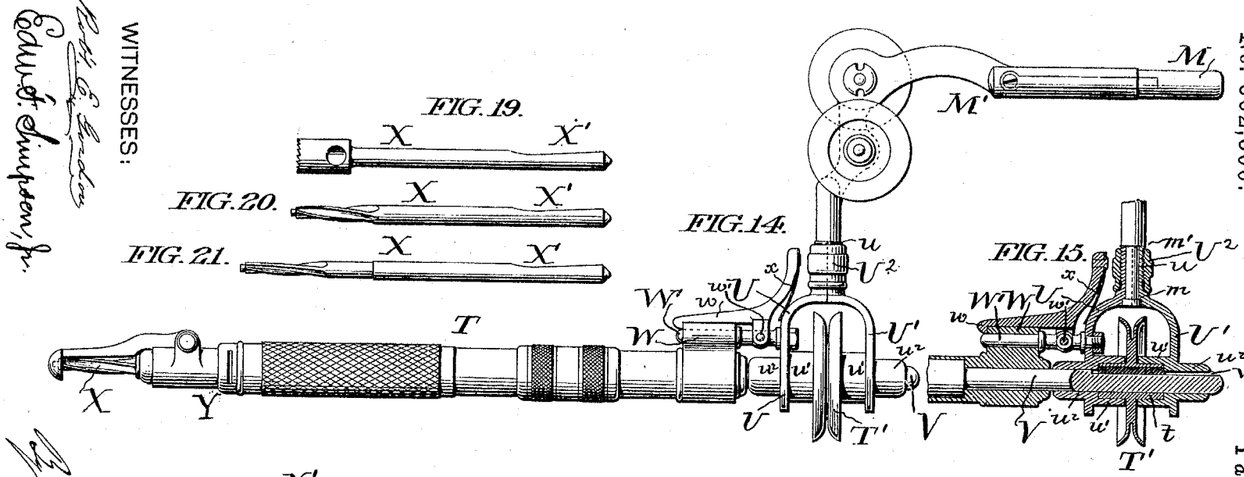
Fig. 14 is a view showing the handpiece, a portion of the engine-arm, the handpiece frame or carrier, and connections between the parts.
Fig. 15 is a central section showing details of the connections between the handpiece-carrier, the handpiece, and the wrist-joint section of the engine-arm.
Figs. 19, 20, and 21 are views of some of the surgical instruments adapted for use with the engine.

Connection between the wrist-joint section M' of the engine-arm and a freely-swiveling supporting-frame or carrier for a handpiece T and spindle-actuating pulley T' is made as follows: The wrist-joint M' is provided at its extremity with a round pin having the end shoulder $m$ and reduced in diameter from this shoulder to the shoulder $m'$. The frame or carrier comprises a sectional yoke, the two parts U U' of which when brought together form an externally-threaded split sleeve $u$. This sleeve is adapted to receive the wrist-joint pin with one end of the sleeve in contact with the shoulder $m'$ of the pin, and with the end shoulder $m$ of the pin occupying the internally-enlarged opposite end of the sleeve, so as to prevent endwise movement of the pin in the sleeve, which is embraced by the long nut or internally-threaded sleeve $U^2$, which securely holds the parts of the carrier-yoke together. By unscrewing this sleeve $U^2$ the sections of the yoke may be separated. Each section of the carrier-yoke is formed with a bearing $u'$ for the hub $t$ of the pulley T', as well as with a bearing $u^2$ for the instrument-carrying spindle V. The pulley-hub is mounted within its bearing $u'$ and is provided internally with a spline or rib to engage the groove $v$ in the rear end of the spindle, which projects beyond the handpiece and thus causes the spindle to rotate with the pulley. The handpiece-casing is provided at its inner or rear end with a lateral projection constituting a short sleeve or tubular lug W to slip upon a round arm or pin W', rigidly connected with the part U of the sectional carrier. A trigger-like catch $w$ is jointed by a pivot $w'$ to the pin W' and is acted upon by a spring $x$, the tendency of which is to hold the catch in its operative position or engaged at its outer end with the sleeve of the handpiece-casing, as shown in Fig. 14. By pressing upon the inner or rear end of the catch it may be rocked against the pressure of its spring to admit of the withdrawal of the handpiece from its carrier.

Figure 16:
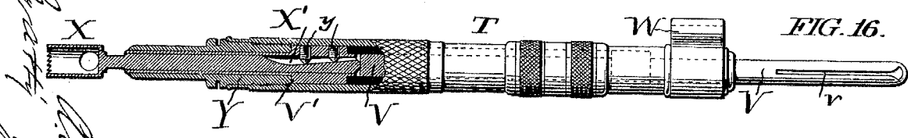
Fig. 16 is a view, partly in longitudinal central section, showing the handpiece and an attached surgical instrument.
Figure 17:
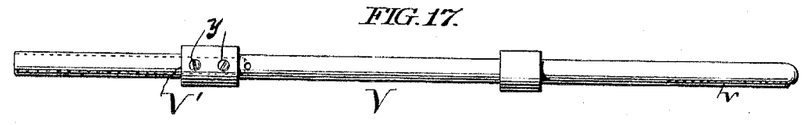
Fig. 17 shows the rotary spindle of the handpiece.
Figure 18:
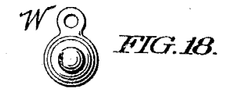
Fig. 18 is a view of the handpiece, looking at its rear.

The handpiece-spindle V is tubular from its front end rearwardly for a portion of its length to receive any suitable surgical instrument X, the shank of which is provided with an inclined groove X' to be engaged by screws $y\ y$, passing through the enlarged or annularly-shouldered portion V' of the spindle. The spindle with attached tool is secured in the handpiece-casing by the externally-threaded sleeve or nose-piece Y engaging the internally-threaded end of the handpiece-casing and abutting against the spindle-shoulder V'.

It will be seen that a handpiece with its spindle carrying a tool and projecting rearwardly from the handpiece may very quickly be connected with the handpiece-carrier, the inclined end of the catch yielding to engage the sleeve on the handpiece, and the spindle at the same time be engaged with its actuating-pulley, and that a handpiece and attached spindle and tool may instantly be detached from the handpiece-carrier without disturbing the pulley, which is so mounted in the carrier as to be maintained in proper position independently of the handpiece and spindle. It will be seen that no part of the handpiece-casing extends rearwardly beyond the front end of its supporting-frame or carrier, and that the readily-separable connection between the handpiece and carrier is solely by way of the rearwardly-projecting spindle and suitable catch devices by which the rear end of the handpiece is detachably engaged with the carrier in advance thereof.

As in surgical operations quickness of work is frequently of the utmost importance, it will be seen that by providing a number of handpieces having attached the various instruments to be used in an operation a handpiece carrying one instrument may be detached from its carrier and another handpiece with the instrument next needed quickly inserted in its place, and this in turn changed for another, and so on, with the least possible loss of time.

It is to be understood that some features of my improvements are applicable to treadle-actuated engines and may be employed for dental as well as surgical purposes.

I claim as my invention—

1. The engine-frame base provided with legs, one of which is jointed in place by a vertical pivot so as to be capable of swinging horizontally, and also provided with the vertical central socket, substantially as and for the purpose set forth.

2. The combination of the frame-base having the fixed legs and the vertical central socket and provided with the leg jointed in place so as to be capable of swinging horizontally, and the frame-upright detachably engaging the socket in the base and engaged by the jointed leg which is thus held against swinging movement, substantially as and for the purpose set forth.

3. The combination of the base having the two rigid legs and the pivoted leg having the fork concaved at its extremity, and provided with the socket at the junction of the legs, the frame-upright fitting in the socket of the base and engaged by the concaved fork of the pivoted leg, and means for engaging and locking together the base and upright, substantially as and for the purpose set forth.

4. The engine-frame base having three legs, two of which are rigidly connected by a foot-rest, and to one of which so-connected legs is secured another foot-rest projecting in or about in the same direction as that in which the third leg of the frame projects, substantially as and for the purpose set forth.

5. The combination of the base having the two rigid legs connected by a foot-rest and provided with a third leg, and the foot-rest jointed at its heel to one of the rigid legs and projecting in or about in the same direction as that in which said third leg projects and limited in its movement about its pivot by contact with the leg to which it is pivoted, substantially as and for the purpose set forth.

6. The combination of the engine-frame, the gearing-frame detachably supported at the top thereof, the gearing within the gearing-frame, the pulley actuated by said gearing and having supporting connection with the gearing-frame, and the engine-standard detachably connected at its lower end with the gearing-frame and carrying at its upper end the mechanism which is driven by the gearing-actuated pulley, substantially as and for the purpose set forth.

7. The combination of the pulley-head section of the engine-standard, the carrier for the engine-arm having supporting connection with said section, the engine-arm pivotally connected near its inner end with said carrier, and the spring secured to the engine-arm at one end and bearing and sliding at its opposite end upon the carrier, substantially as and for the purpose set forth.

8. The sectional carrier for the handpiece comprising the yoke made in two parts and constituting the externally-threaded split sleeve, each of said parts being provided with a pulley-hub bearing, substantially as and for the purpose set forth.

9. The combination of the yoke-sections constituting the externally-threaded split sleeve and having the pulley-hub bearings, the pin of the wrist-joint section of the engine-arm held in said split sleeve, the internally-threaded sleeve for embracing the split sleeve of the yoke-sections, and the pulley mounted by its hub in its bearings in the sectional yoke, substantially as and for the purpose set forth.

10. The combination of the handpiece-carrier, the handpiece-casing terminating at rear in advance of the carrier, the tool-carrying spindle mounted to rotate in the handpiece-casing and projecting beyond the rear end thereof, means for rotating the spindle having direct detachable connection with the rear end thereof, and catch devices for detachably engaging the rear end of the handpiece-casing with the carrier, substantially as and for the purpose set forth.

11. The combination of the carrier, the handpiece-casing terminating at rear in advance of the carrier, the tool-carrying spindle mounted to rotate in the handpiece-casing, projecting beyond the rear thereof and through the carrier and longitudinally grooved at its rear end, the pulley with its hub having bearing in the carrier and adapted to engage the grooved end of the spindle, and catch devices for detachably engaging the rear end of the handpiece-casing with the carrier, substantially as and for the purpose set forth.

12. The combination of the handpiece-casing provided with the lateral tubular lug or short sleeve, the tool-carrying spindle mounted to rotate in the handpiece-casing, projecting beyond the rear thereof and longitudinally grooved at its rear end, the carrier, in advance of which the handpiece-casing terminates, the pin and spring-actuated catch of the carrier for engaging the tubular lug of the handpiece-casing, and the pulley provided with the hub having bearing in the carrier and adapted to engage the grooved end of the spindle, substantially as and for the purpose set forth.

In testimony whereof I affix my signature in presence of two witnesses.

ARTHUR W. BROWNE.

Witnesses:
SEYMOUR CASE,
M. A. COLE.